AUTOMATIC RETURN DEVICE FOR RECORD PLAYERS

Filed Nov. 13, 1967 4 Sheets-Sheet 1

Inventors
Toshihiko Nagano
Takamichi Nakagawa

By Stevens, Davis, Miller & Mosher

Attorneys

Inventors
Toshihiko Nagano
Takamichi Nakagawa
By Stevens, Davis, Miller & Mosher
Attorneys

AUTOMATIC RETURN DEVICE FOR RECORD PLAYERS

Filed Nov. 13, 1967

Inventors
Toshihiko Nagano
Takamichi Nakagawa
By Stevens, Davis, Miller & Mosher
Attorneys

AUTOMATIC RETURN DEVICE FOR RECORD PLAYERS

Filed Nov. 13, 1967

Inventors
Toshihiko Nagano
Takamichi Nakagawa
By Stevens, Davis, Miller & Mosher
Attorneys

United States Patent Office 3,484,112

Patented Dec. 16, 1969

3,484,112

AUTOMATIC RETURN DEVICE FOR RECORD PLAYERS

Toshihiko Nagano, Moriguchi-shi, and Takamichi Nakagawa, Kadoma-shi, Japan, assignors to Matsushita Electric Industrial Co., Ltd., Osaka, Japan, a corporation of Japan Filed Nov. 13, 1967, Ser. No. 682,080

Claims priority, application Japan, Nov. 22, 1966, 41/77,043

Int. Cl. G11b *17/06*

U.S. Cl. 274—15 6 Claims

ABSTRACT OF THE DISCLOSURE

An automatic return device for a pickup arm of a record player comprising an actuating lever and an operating lever secured to an operating knob, the actuating lever being electrically or mechanically clamped in its rotated position, in which slowing means having a driving plate linked with the actuating lever and a slow moving plate resiliently connected with the driving plate is provided to effect the slow vertical and return motion of the pickup in response to the state of the actuating lever which is released from the clamped state by a pickup arm position detector upon completion of playing of a record.

The present invention relates to an automatic return device for record players, by which the pickup arm of a record player is lifted and returned to the initial position automatically, whenever an operating knob has once been set in position. The present invention has for its object the provision of a novel automatic return device which is simple in construction, operates quietly, is capable of returning the pickup arm even from a position intermediate of its stroke in a simple and positive manner, and can be shifted for manual operation.

A conventional automatic return device for record players comprises a gear mounted on the lower portion of the rotary shaft of the turn-table, a main gear provided on said gear and having a notch formed at a portion thereof, and an operating arm connected to said main gear, said first gear being brought into engagement with said main gear to rotate the same in response to the change in operation of the pickup arm moving from the sound-recorded track to non-recorded track and thereby operating said operating arm to effect lifting and return movement of the pickup arm. The conventional devices of the construction described above, however, have the drawback that they involve a large number of component parts, such as a gear, a main gear, a connecting rod or operating arm and means for detecting the operation of the pickup arm, and consequently they are highly complicated in construction, poor in production efficiency, unstable in operation, large in size, heavy in weight and uneconomical. Another drawback is that, since the drive force for the rotary shaft is directly used for lifting and returning the pickup arm, the motion of the pickup arm during its upward and return movements is rough or even shocking, imposing deleterious effects on the rotary shaft and other mechanisms, which further result in the life of the entire record player being shortened. Still another drawback is that the devices are disadvantageous economically because a motor of a considerably large capacity must be provided as a drive source for such devices and further the devices are not adapted for use with a light needle pressure pickup. In addition, none of these devices are provided with means to shift the same for manual operation.

The aforementioned drawbacks of the conventional automatic return devices can be eliminated by the present invention.

The present invention will now be described in detail hereunder with reference to the accompanying drawings, in which.

Figure 1:
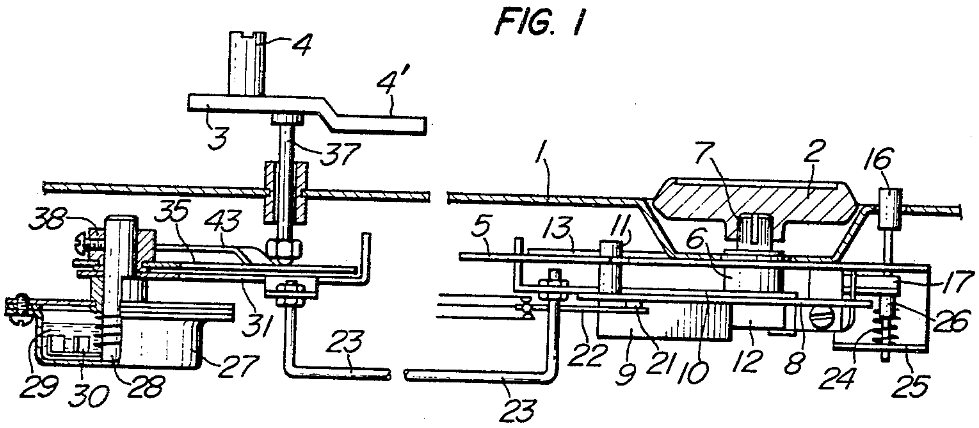
FIG. 1 is a side view of an automatic return device for a record player, embodying the present invention.

Referring first to FIGS. 1 to 4, reference numeral 1 designates the top panel of a record player, on which an operating knob 2, a pickup lift 3, a pickup arm 4 and a turntable are provided.

Figure 4:
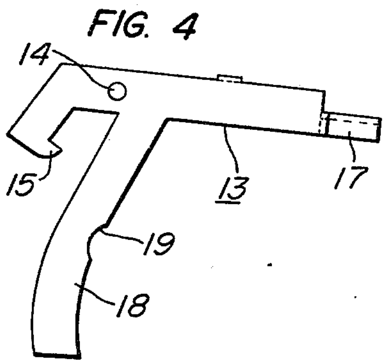
FIG. 4 is a top plan view of a clamp plate used in the device.
Figure 2:
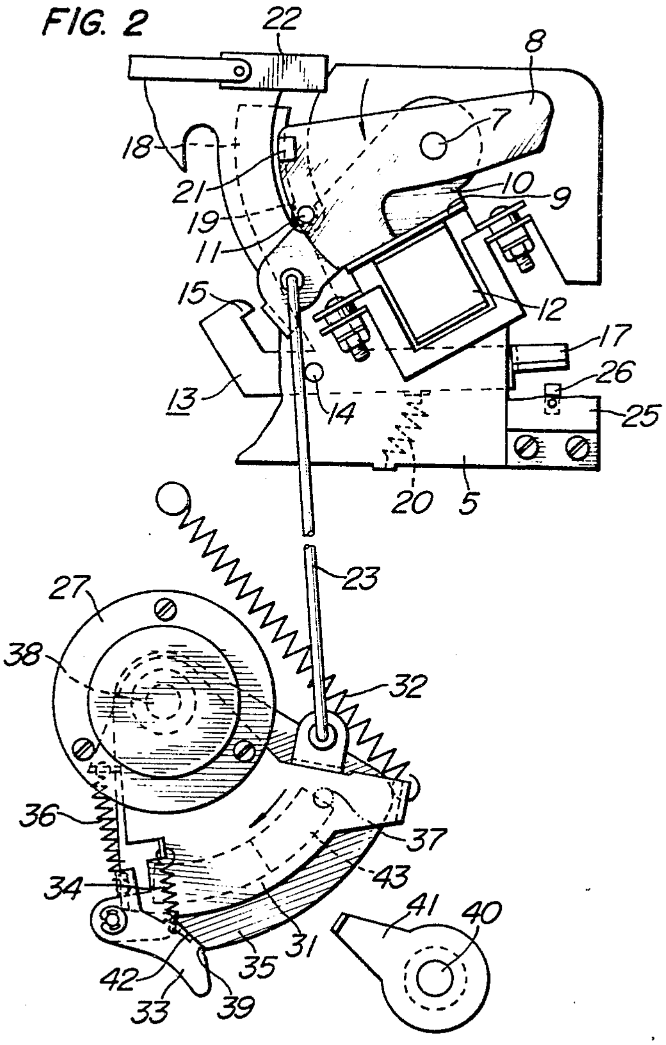
FIG. 2 is a bottom view of the device.

The operating knob 2 is connected to a switching mechanism by which the pickup return device is shifted from automatic to manual operation or vice versa. The switching mechanism comprises a base plate 5 fixed to the underside of the top panel 1, a boss 6 mounted on the underside of the base plate 5, an operating knob mounting shaft 7 extending through said boss and an operating lever 8 fixed to the lower end of said shaft 7. On the operating lever 8 is provided an actuating lever 10 which is pivotally mounted on the shaft 7 and provided on one side thereof with an attraction plate 9. One end of the operating lever is held in abutment against the attraction plate 9 of the actuating lever 10 so as to move said actuating lever. The operating lever 8 carrying thereon a pin 11 which is adapted to engage an arm 18 of a clamp plate 13 to be described later, to provide for the return movement of the actuating lever 10. During the return movement, the actuating lever 10 pushes the end portion of the operating lever 8 by the attraction plate 9. The operating lever 8 is also formed with a downwardly extending lug 21 at one end thereof. An electromagnet 12 is provided at such a position that it is confronted by the attraction plate 9 when the actuating lever 10 of the base plate 5 is in a rotated position. Thus, it will be understood that the electromagnet 12 attracts and holds the attraction plate 9 when it is excited. The clamp plate 13, provided on the base plate 5, has a substantially T-shaped configuration as shown in FIG. 4 and is mounted on a pivot pin 14 for pivotal movement thereabout. A first arm of the clamp plate 13 is formed with a hook 15. A second arm of the clamp plate 13, extending from the first arm, is formed with an angle 17 which is adapted to engage a switch button 16 to set the switching mechanism for manual operation. This switch button 16 is projecting above the top panel 1, with the lower end thereof supported by an arm 25, and is biased upwardly by a spring 14 mounted thereon between the arm 25 and a clamping member 26 which is provided at an intermediate portion of said button to clamp the angle 17. A third arm of the clamp plate is formed with a curved portion 18 for engagement with a pin 11 carried on the operating lever 8, and a notch 19 is formed in said curved portion. The clamp plate 13 is urged in one direction by a spring 20 which has the other end connected to the base plate 5. The lug 21 extending downwardly from the operating lever 8 serves to open and close a switch 22 for the electric circuit for the electromagnet 12, as said operating lever moves. A link 23 has one end thereof connected to one end portion of the actuating lever 10 and the other end connected to a return device to be described later.

Now, the construction of the return device will be described hereinafter.

Below the top panel 1 is provided at a predetermined level slowing means 27 consisting of a container filled with a highly viscous oil 29, such as silicon oil. This slowing means 27 has a rotary shaft 28 mounted at the center thereof and the lower portion of the rotary shaft 28, extending into the container, is provided with driving paddles 30, so that the rotation of the rotary shaft 28 is slowed down by the resistance between the driving paddles 30 and the oil 29. A substantially fan-shaped driving plate 31 is pivotally mounted on the rotary shaft 28 and one end of the link 23 is connected to one side edge portion of the driving plate 31. The driving plate 31 also has one end of a return spring 32 connected thereto, the other end of which is connected to the top panel 1. The driving plate 31 carries a kicking member 33 which is pivotally connected to a portion of the peripheral edge of said driving plate and is biased in one direction by a spring 34. On top of the driving plate 31 is provided a slow moving plate 35. This slow moving plate 35 is mounted on a boss 38 which is fixedly mounted on the rotary shaft 28, and is operatively connected to the driving plate 31 by means of a spring 36. The slow moving plate 35 is formed thereon with a cam strip 43 which is in sliding contact with the lower end of the support shaft 37 of the pickup lift 3. The kicking member 33 carried by driving plate 31 is provided with a projection 39 which is held in pressure contact with one side edge 42 of the slow moving plate 35. In the path of rotation of the kicking member 33 is arranged a return member 41 securely mounted on a rotary shaft 40 of the pickup arm 4.

Figure 5:
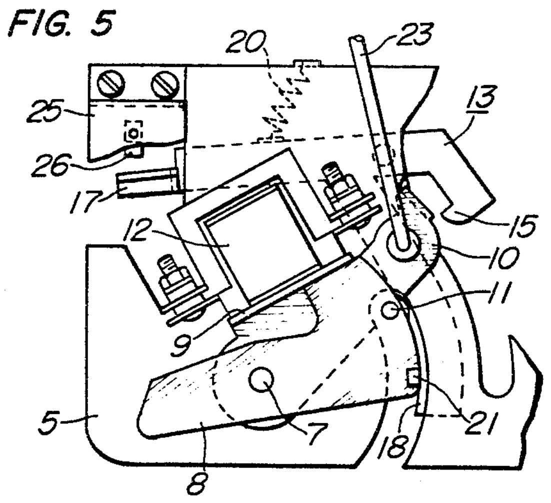
FIGS. 5 and 6 are bottom plan views showing the manner in which the device operates.
Figures 7, 8, 9:
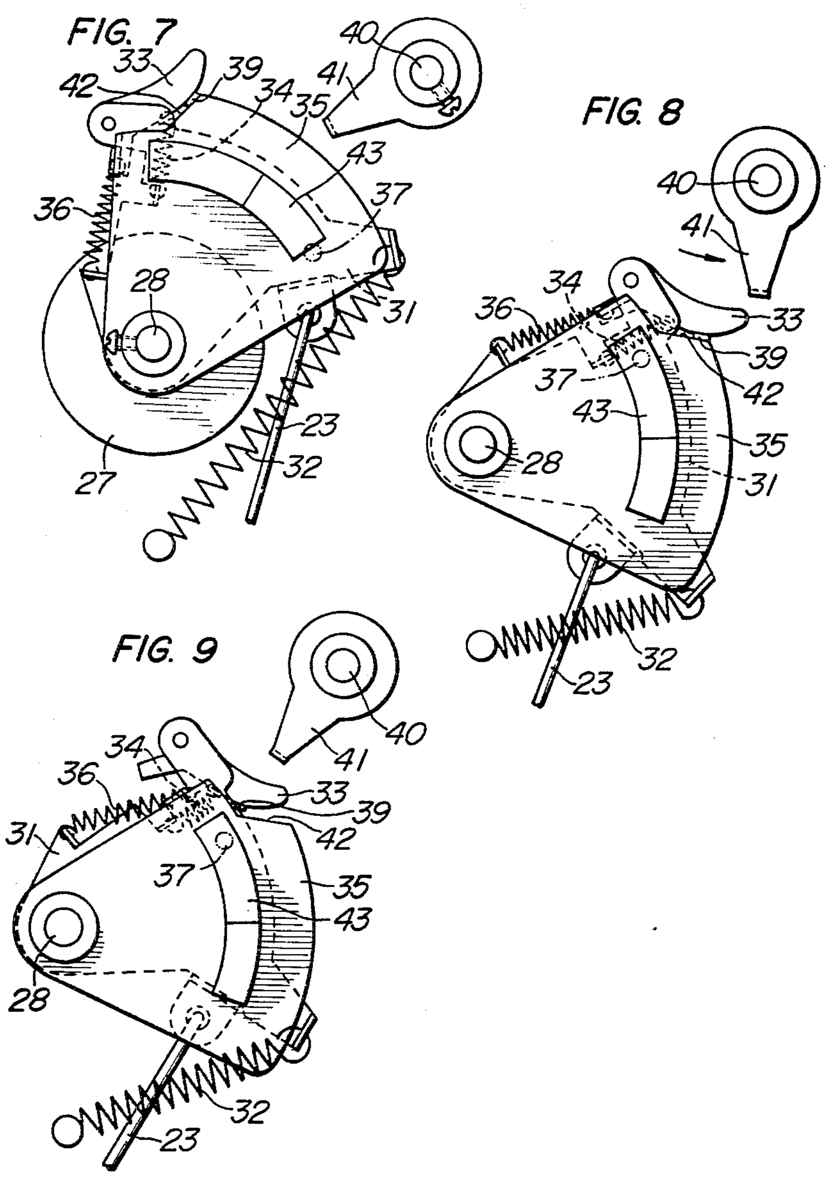
FIGS. 7 to 9 are top plan views showing the manner in which the device operates, FIG. 8 showing the rest position.

In operating the automatic return device of this invention constructed as described above, the operating knob 2 is first of all rotated in a clockwise direction. The rotation of the operating knob causes the operating lever 8 to rotate in the direction of the arrow in FIG. 2, while pushing the attraction plate 9 of the actuating lever 10, so that the actuating lever 10 is also rotated concurrently in the same direction. In this case, the lug 21 of the operating lever 8 closes the switch 22 to form an electric circuit for the automatic return operation, and then closes a turntable driving switch not shown. As a result, the turntable begins to rotate and the electromagnet 12 is excited by a current conducted therethrough. When the operating lever 8 and the actuating lever 10 reach the respective positions shown in FIGS. 2 and 5, the electromagnet 12 attracts the attraction plate 9 and holds the actuating lever 10 in that position. The action of the operating lever 8 and the actuating lever 10 is transmitted through the link 23, connected to the actuating lever 10, to the driving plate 31 being held in the position shown in FIG. 7, whereby the driving plate 31 is caused to rotate about the rotary shaft 28 in the direction of the arrow against the tension of the return spring 32. The slow moving plate 35, operatively connected to the driving plate 31 by the spring 36, follows the driving plate 31 slowly under the tension of the spring 36 as shown in FIG. 9, overcoming the resistance between the driving paddles 30 and the oil 29. In this case, since the inner end of the kicking member 33 is substantially located in the arc of the peripheral edge of the slow moving plate 35, it does not kick the return member 41 of the pickup arm 4. As the slow moving plate 35 rotates, the support shaft 37 of the pickup lift 3 slowly slides downwardly on the scope of the cam strip 43. In this case, the pickup arm 4 is previously located at the peripheral edge of a record to be played.

Upon completion of playing the record (the position of the automatic return device in this case is shown in FIG. 7), a signal indicating the completion of record playing is emitted and the current flowing through the electromagnet 12 in the electric circuit of the automatic return device is interrupted as by a transistor. Such signal can be obtained easily from detecting means consisting, for example, of CdS to detect the pickup position. By such action of the electric circuit, the electromagnet is deenergized and the attractive force acting on the attraction plate is eliminated. As a result, the driving plate 31 is first rotated in a direction opposite to the direction of the arrow and returned to its initial position by the action of the return spring 32. By the return movement of the driving plate, the kicking member 33 is caused to slide on the slanting edge 42 of the slow moving plate 35 to project outwardly of the peripheral edge of said slow moving plate, and pushes said slow moving plate in that state. Thus, the slow moving plate is moved slowly by a force which is the balance of the resistive force between the oil 29 and the driving paddles 30, and the tension of the return spring 32. As a result of return movement of the slow moving plate 35, the support shaft 37 of the pickup lift 3 is moved upwardly by the slope of the cam strip 43 in sliding contact therewith and accordingly the pickup arm 4 is lifted slowly. Upon completion of the upward movement of the pickup arm 4, the kicking member 33 kicks the return member 41, mounted on the rotary shaft 40 of the pickup arm 4, to a position shown in FIG. 8. Thus, the pickup arm 4 is returned to the position in which it was held initially before playing the record, and rests on a shoulder 4' on the pickup lift 3 to prepare for the next cycle of operation. As the driving plate 31 and the slow moving plate 35 return to their initial positions, the operating lever and actuating lever 10 are rotated in a direction opposite to the direction of the arrow shown in FIG. 2, by the action of the link 23. The switch for the drive motor is opened when the pickup arm 4 is fully lifted from the turn-table, and the operating knob 2 is returned to its original position. This completes a series of operation.

When the pickup arm is desired to be returned in the middle of playing a record, the operating knob 2 is rotated in a counterclockwise direction. In this case, the operating lever 8 only is rotated in a direction opposite to the direction of the arrow in FIG. 2 or in the counterclockwise direction, opening the switch 22 by the lug 21. Therefore, the attractive force of the electromagnet 12 disappears, permitting the actuating lever 10 to return to its original position under the force of the return spring 32. Thereafter, the pickup arm 4 is returned to its original position in the same manner as described previously.

The automatic return device operating in the manner described above, may be shifted for manual operation in the following manner.

Figure 3:
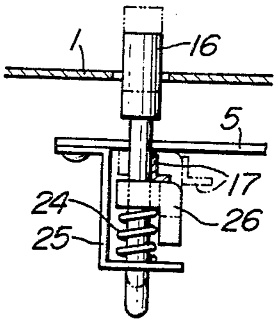
FIG. 3 is an enlarged side view showing the critical portion of the device.
Figure 6:
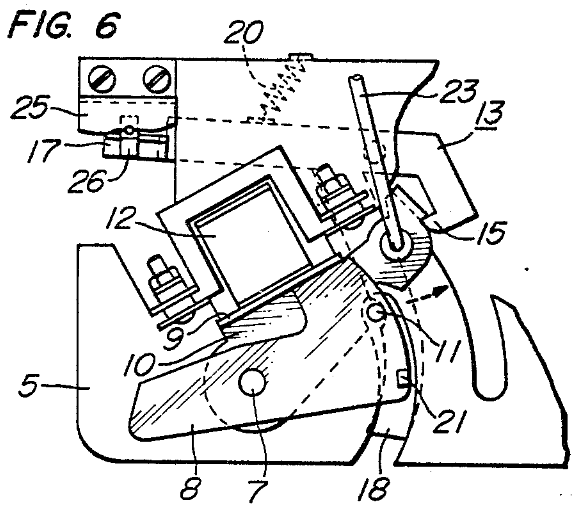

When the electromagnet 12 for attracting the attraction plate 9 of the actuating lever 10 becomes faulty or when it is desired to return the pickup arm manually or when the power source battery for the electromagnet 12 is not available, the operating knob 2 is rotated in a clockwise direction as in the case of automatic operation. In this case, the operation of the other mechanisms is the same as in the case of automatic operation and therefore will not be described again. By rotating the operating knob 2, the switch button 16 for manual operation, shown in FIG. 3, is depressed against the biasing force of the spring 24. The angular portion 17 of the clamp plate 13, which has been in abutment against the clamping member 26, slides onto the top of said clamping member by the action of the spring 20 and thus the clamp plate 13 makes a pivotal movement about the pivot pin 14. The stop pin 11 on the operating lever 8 is engaged by the notch 19 in the arm 18 of the clamp plate 13, whereby the end portion of the actuating lever 10 is latched by the hook 15 of the clamp plate 13. The positions of the associated parts in this case are shown in FIG. 6. Upon removing the depressing force from the switch button 16, the angular portion 17 of the clamp plate 13 is clamped by the clamping member 26 under the elastic force of the spring 24. In this state, the pickup arm can be operated manually.

Now, when the manual operation setup is desired to be released, the operating knob 2 is rotated counterclockwise. By this operation, the stop pin 11 of the operating lever 8 is disengaged from the notch 19 of the clamp plate 13, causing the arm 18 to move in the direction of the broken line arrow in FIG. 6. The clamp plate 13 therefore rotates about the pivot pin 14 and thus the engagement between the hook 15 and the end portion of operating lever 10 is released, providing for automatic operation of the device. In this case, the clamping member 26 of the switch button 16 releases the angular portion 17 of the clamp plate 13 and returns to its original position by the action of the spring 24.

Because of the construction and operation described hereinabove, it is possible, by employing the automatic return device for the record player of this invention, to effect automatic return of the pickup arm by only operating the operating knob, and yet the motion of the pickup arm in the return movement is quiet, even if the operating knob is operated with a violent force. Further, the automatic return device of this invention is simple in construction and easy to manufacture, and therefore of economical advantage. Speaking more practically, according to the present invention, since the lifting and return movement of the pickup arm are effected by the action of the slow moving plate which follows the driving plate, connected to the actuating lever, at a speed lower than that of said driving plate as a result of the speed reduction by the slowing means, there is no need of making use of the drive of the motor of the record player, as a driving source for the pickup, and the construction is thereby rendered simple. Additionally, since the automatic return device imposes no load on the motor as described, the life of the record player can be prolonged. Furthermore, the fact that the return movement of the pickup takes place independently of the turn-table, makes the use of the automatic return device of this invention highly advantageous, because no consideration is required for operatively connecting the pickup return device with the turn-table driving source during the design stage. Still further, the motion of the pickup is very smooth and, owing to the use of the operating knob, the operation of returning the pickup, even in the course of record playing, can be initiated very simply. This is possible because of such construction of the present invention in which the operating lever connected to the operating knob is operatively connected to the actuating lever and said operating lever is provided with the stop pin which serves to rotate only the operating lever when said actuating lever is locked electrically or mechanically and thereby release said actuating lever from the locked position, by opening the switch for the electromagnet in the case of automatic operation or by unlatching the clamp plate in the case of manual operation, to provide for the automatic return movement of the pickup. Therefore, by simply operating the operating knob, the pickup can be returned to the original position from any position intermediate of its stroke automatically and quietly, without damaging the needle or record plate. Still further, since the automatic return device of this invention can be shifted for manual operation under any condition, e.g. when the parts associated with the electromagnet have become faulty or the power source for the electromagnet has been used up, or a record is being played, by only depressing the switch button and thereby locking the actuating lever connected to the operating knob, the record player with the device of this invention incorporated therein can be offered to the customers with ease. Still further, since the switch does not directly actuate the automatic return device, the pickup is subjected to no shock or vibration even when the pickup return operation is shifted from automatic to manual or vice versa during the process of the record playing, so that objectionable phenomena such as skidding of the needle can be eliminated completely. Still further, according to the present invention, the operator is not required to make sure about the setup of the device, whether for automatic or manual operation, before playing a record, because the manual operation setup can be released automatically upon completion of the return movement of the operating knob. As such, the automatic return device of this invention has numerous advantages and therefore is of great industrial value.

What is claimed is:

1. An automatic return device for a record player for effecting the vertical motion and rotative return motion of a pickup, comprising an operating knob provided on a top panel of the record player, means including an actuating lever and an operating lever connected to said operating knob, means to lock said actuating lever in its rotated position, said locked actuating lever being released by enforced restoration of said operating lever, slowing means having a driving plate coupled to said actuating lever by a link and a slow moving plate and a slow moving plate with a cam strip provided for causing the vertical movement of the pickup on a part thereof, said slow moving plate being secured to a rotary shaft of the slowing means, spring means connecting said slow moving plate to said driving plate, and said driving plate being provided with return members for returning the pickup on the completion of playing of a record.

2. An automatic return device according to claim 1 wherein said means to lock said actuating means is electrical.

3. An automatic return device according to claim 1 wherein said means to lock said actuating means is mechanical.

4. An automatic return device according to claim 1 further comprising means for shifting the operation of said device from automatic to manual operation, comprising a switch button, an automatic mechanism including a clamp plate adapted to be connected to said switch button in conjunction with automatic operation, said locking means including electromagnetic means for locking said actuating lever at its rotated position by the attractive force of said electromagnet and mechanical locking means for locking said actuating lever at its rotated position, means connected to said switch button to change from electrical to mechanical locking by depressing said switch button, whereby the vertical and return movement of the pickup, which under automatic operation is effected by two actuating plates connected to the actuating lever cooperating with the slowing means, is rendered manually operative.

5. An automatic return device according to claim 1 further comprising an operating lever fixedly mounted on a shaft bearing said operating knob, an attraction plate provided on said actuating lever, said actuating lever being pivotally mounted on said shaft of the operating lever and operatively connected to said slowing means, an electromagnet having an energizing circuit and being mounted to attract said attraction plate, switch means in said circuit adapted to be opened and closed by said operating lever, a portion of said operating lever abutting said attraction plate to drive said actuating lever and means to interrupt current flowing through said electromagnet upon completion of record playing and thereby to permit the actuating lever to return the operating lever to its original position by the returning force of said slowing means.

6. An automatic return device according to claim 1 further comprising a rotary shaft provided in said slowing means and rotating slowly under viscous resistance, a driving plate pivotally mounted on said rotary shaft, a slow moving plate fixedly mounted on said rotary shaft and having formed thereon a cam adapted to cause vertical movement of the pickup, said driving plate being operatively connected at one end to said driving lever, a return spring having one end connected to said driving plate and the other end to the top panel of the record player, and a spring operatively connecting said driving plate to said slow moving plate, the arrangement being such that when the driving plate is moved by the actuating lever, the slow moving plate is moved slowly following said driving plate and then both said driving plate and said slow moving plate are returned to their original positions slowly by the action of said return spring.

References Cited

UNITED STATES PATENTS

| | | | |
|---|---|---|---|
| 2,602,668 | 7/1952 | Finneran et al. | 274—15 |
| 3,265,394 | 8/1966 | Carlisle | 274—15 |
| 3,309,093 | 3/1967 | Staar | 274—15 |
| 3,385,603 | 5/1968 | Knopfle | 274—15 |

HARRY N. HAROIAN, Primary Examiner